US012488547B2

(12) United States Patent
Kim

(10) Patent No.: US 12,488,547 B2
(45) Date of Patent: Dec. 2, 2025

(54) METHOD FOR PROVIDING CONTENT CREATION FUNCTION AND ELECTRONIC DEVICE SUPPORTING SAME

(71) Applicant: SAMSUNG ELECTRONICS CO., LTD., Suwon-si (KR)

(72) Inventor: Kyunghwa Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 18/351,268

(22) Filed: Jul. 12, 2023

(65) Prior Publication Data

US 2023/0360342 A1 Nov. 9, 2023

Related U.S. Application Data

(63) Continuation of application No. PCT/KR2021/002608, filed on Mar. 3, 2021.

(30) Foreign Application Priority Data

Jan. 12, 2021 (KR) .................. 10-2021-0003675

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2004* (2013.01); *G06T 2219/2016* (2013.01)

(58) Field of Classification Search
CPC .................. G06T 19/006; G06T 19/20; G06T 2219/2004; G06T 2219/2016; G06T 11/00;

(Continued)

(56) References Cited

U.S. PATENT DOCUMENTS 9,049,428 B2  6/2015  Kuroda
9,754,414 B2  9/2017  Kim et al.
(Continued)

FOREIGN PATENT DOCUMENTS

CN   111179435 A   5/2020
EP   2 738 743     6/2014
(Continued)

OTHER PUBLICATIONS

International Search Report for PCT/KR2021/002608 mailed Oct. 6, 2021, 2 pages.
(Continued)

*Primary Examiner* — Chong Wu
(74) *Attorney, Agent, or Firm* — Nixon & Vanderhye, P.C.

(57) ABSTRACT

An example electronic device may include at least one camera module; at least one display module; a memory for storing a plurality of virtual objects, each virtual object including a plurality of sub-objects each having a depth; a processor operatively connected to the at least one camera module, the at least one display module, and the memory, wherein the processor may be configured to: output a first image of a real object obtained using the at least one camera module, output a list of virtual objects applicable to the first image, output sub-objects corresponding to the virtual object selected from the list, and generate a second image in which at least one sub-object selected from among the sub-objects is applied to the first image.

20 Claims, 21 Drawing Sheets

(58) Field of Classification Search
CPC .............. G06F 3/0482; G06F 3/04842; G06F 3/04845; G06Q 10/10; G06Q 30/0276; G06Q 30/0643; G06Q 50/01; G06V 20/20; H04M 1/72403; H04M 2250/52; H04N 5/2621; H04N 23/631
See application file for complete search history.

(56) References Cited

U.S. PATENT DOCUMENTS

| | | | |
|---|---|---|---|
| 10,019,851 B2 | 7/2018 | Collum et al. | |
| 10,055,895 B2 | 8/2018 | Li et al. | |
| 10,242,503 B2 | 3/2019 | McPhee et al. | |
| 10,529,146 B2 | 1/2020 | Collum et al. | |
| 10,681,287 B2 | 6/2020 | Park et al. | |
| 10,740,978 B2 | 8/2020 | McPhee et al. | |
| 10,748,347 B1 | 8/2020 | Li et al. | |
| 10,785,413 B2 | 9/2020 | Malia et al. | |
| 10,832,460 B2 | 11/2020 | Kim et al. | |
| 11,164,388 B2 * | 11/2021 | Lee | H04N 5/2628 |
| 11,195,338 B2 | 12/2021 | McPhee et al. | |
| 11,303,812 B2 | 4/2022 | Malia et al. | |
| 11,308,706 B2 | 4/2022 | Li et al. | |
| 2014/0152698 A1 | 6/2014 | Kim et al. | |
| 2015/0331970 A1 | 11/2015 | Jovanovic | |
| 2015/0332508 A1 | 11/2015 | Jovanovic | |
| 2018/0182149 A1 | 6/2018 | Chong et al. | |
| 2018/0203951 A1 | 7/2018 | Jovanovic | |
| 2019/0088030 A1 | 3/2019 | Masterson et al. | |
| 2020/0174656 A1 | 6/2020 | Shin et al. | |
| 2020/0382718 A1 | 12/2020 | Malia et al. | |
| 2021/0027540 A1 | 1/2021 | Lee et al. | |
| 2022/0239842 A1 | 7/2022 | Malia et al. | |
| 2022/0319136 A1 | 10/2022 | Zeng | |

FOREIGN PATENT DOCUMENTS

| | | |
|---|---|---|
| JP | 2012-058968 | 3/2012 |
| KR | 10-2016-0016574 | 2/2016 |
| KR | 10-1896982 | 9/2018 |
| KR | 10-1891597 | 10/2018 |
| KR | 10-1920035 | 11/2018 |
| KR | 10-2019-0035116 | 4/2019 |
| KR | 10-1991794 | 6/2019 |
| KR | 10-1984915 | 9/2019 |
| WO | 2019/164287 | 8/2019 |

OTHER PUBLICATIONS

Written Opinion of the ISA for PCT/KR2021/002608 mailed Oct. 6, 2021, 3 pages.
Extended Search Report dated Apr. 26, 2024 in European Patent Application No. 21919795.1.
Communication pursuant to Article 94(3) EPC dated Jan. 31, 2025 in European Application No. 21919795.1.

* cited by examiner

METHOD FOR PROVIDING CONTENT CREATION FUNCTION AND ELECTRONIC DEVICE SUPPORTING SAME

CROSS-REFERENCE TO RELATED APPLICATIONS

This application is a continuation application of International Application No. PCT/KR2021/002608 designating the United States, filed on Mar. 3, 2021, in the Korean Intellectual Property Receiving Office and claiming priority to Korean Patent Application No. 10-2021-0003675, filed on Jan. 12, 2021 in the Korean Intellectual Property Office, the disclosures of each of which are incorporated by reference herein in their entireties.

BACKGROUND

Field

The disclosure relates to an electronic device, and more particularly, to a method for providing a content creation function and an electronic device supporting the same.

Description of Related Art

Recently, with the development of digital technology, electronic devices, such as mobile communication terminals, electronic organizers, smartphones, tablet PCs, and wearable devices, which are capable of processing communication and personal information while moving have been variously released to the market. With rapid technology development, such electronic devices have had various functions, such as a video call, an electronic organizer function, a document function, an e-mail function, and an Internet function, in addition to a simple voice call and a short message transmission function.

Meanwhile, recently, the electronic device has provided a content creation function based on augmented reality. The content creation function based on augmented reality may facilitate synthesizing a virtual object with a real object (e.g., an object of a real world such as a face of a user, a body of the user, an accessory worn on the user, a landscape, an animal, a plant, or a thing) and creating personalized content. The virtual object synthesized with the real object may include sub-objects, such as text, icons, or images as display contents on the screen, and the sub-objects may be provided in the form of being arranged on one layer.

SUMMARY

In operating a conventional content creation function based on augmented reality, which is described above, it may be possible to adjust a size of a virtual object reflected in a real object or adjust a location in which the virtual object is reflected.

However, because sub-objects of the virtual object are provided in one layer, they may have the same depth and thus sizes or locations of the sub-objects may also be adjusted collectively according to the adjustment of the size or location of the virtual object. Thus, there may be limitations to creating content expressing a user's own personality.

In various example embodiments, a method may be provided for providing a content creation function for independently changing depths, locations, sizes, and application time points for respective sub-objects corresponding to a virtual object to be applicable to a real object and an electronic device supporting the same.

In an example embodiment of the disclosure, an electronic device may include at least one camera module (including, e.g., a camera), at least one display module (including, e.g., a display), a memory storing a plurality of virtual objects, each virtual object including a plurality of sub-objects, each of which has a depth, and a processor operatively connected with the at least one camera module, the at least one display module, and the memory. The processor may be configured to output a first image for a real object obtained using the at least one camera module, output a list of at least one virtual object of the plurality of virtual objects applicable to the first image, output sub-objects corresponding to a virtual object selected from the list, and generate a second image in which at least one sub-object selected from among the sub-objects is applied to the first image.

In accordance with an example embodiment of the disclosure, an operating method of an electronic device may include outputting a first image for a real object, outputting a list of at least one virtual object including a plurality of sub-objects, each of which has a depth, receiving an input for selecting at least one virtual object applicable to the first image, outputting sub-objects corresponding to the virtual object selected by the input, and generating a second image in which at least one sub-object selected from among the sub-objects is applied to the first image.

In accordance with an example embodiment of the disclosure, an electronic device may include at least one camera module (including, e.g., a camera), at least one display module (including, e.g., a display), a memory storing a virtual object including a plurality of sub-objects, each of which has a depth, and a processor operatively connected with the at least one camera module, the at least one display module, and the memory. The processor may be configured to obtain a first image for a real object obtained using the at least one camera module, determine a location of at least one sub-object applicable to the first image on the first image based on a depth of the at least one sub-object, synthesize the at least one sub-object, the location of which is determined, with the first image to generate a second image, and output the second image.

The electronic device according to various embodiments disclosed in the disclosure may allow independent changing of locations, sizes, and application time points for respective virtual objects included in a virtual object to be applied to a real object, when generating content based on augmented reality, thus permitting content expressing user's personality to be generated.

Effects capable of being obtained from the disclosure are not limited to the effects described above.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 4A-1, 4A-2, and 4A-3 are diagrams for describing a situation in which an example electronic device applies a virtual object to a real object according to various embodiments;

FIGS. 4B-1 and 4B-2 are diagrams for describing a result in which an example electronic device applies a virtual object to a real object according to various embodiments;

FIGS. 11A-1 and 11A-2 are diagrams for describing a situation in which an example effect is applied to a sub-object based on state information associated with an example electronic device;

FIGS. 11B-1 and 11B-2 are diagrams for describing a situation in which an example effect is applied to a sub-object based on state information associated with an object.

With regard to description of drawings, the same or similar reference numerals or designations may be used for the same or similar components.

DETAILED DESCRIPTION

Figure 1:
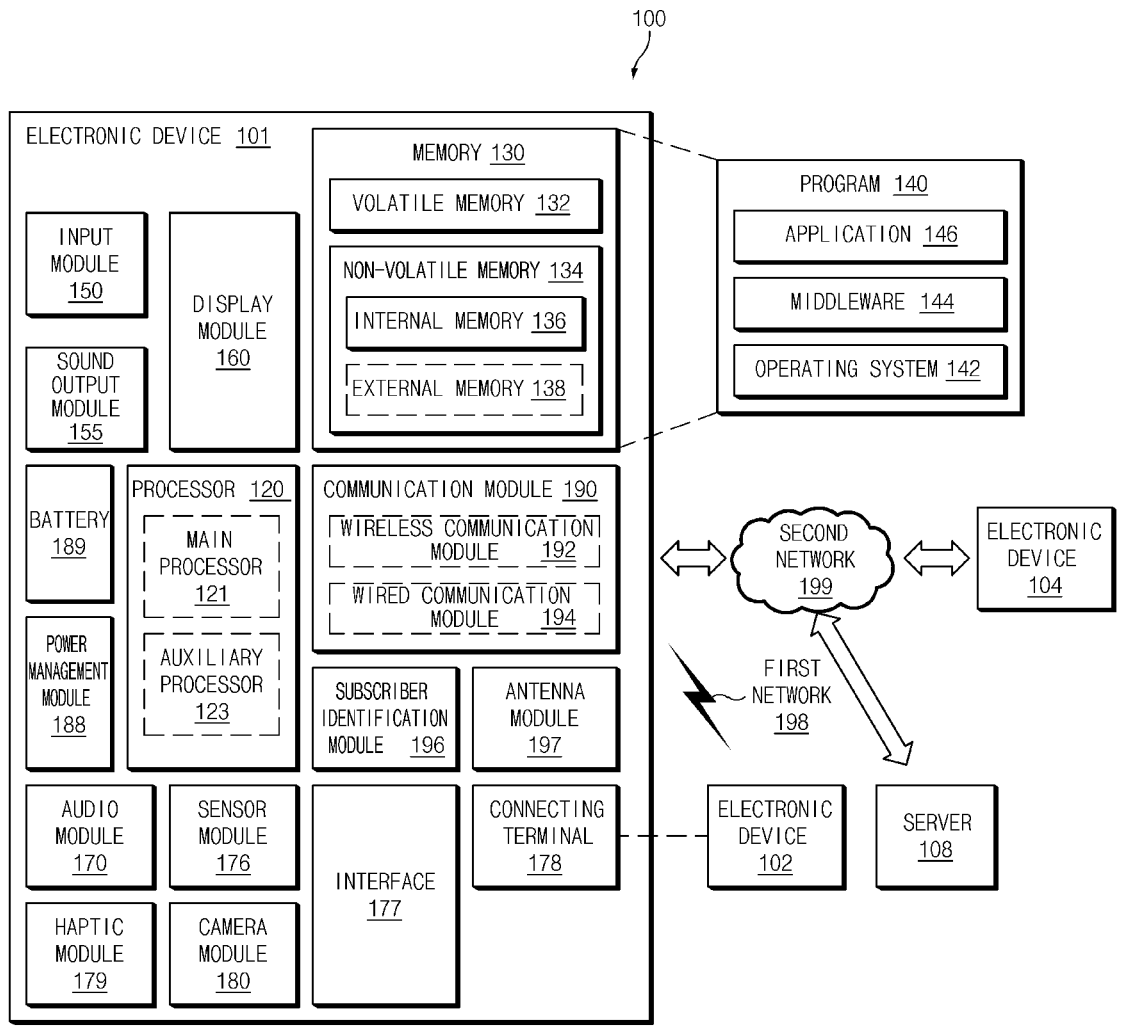
FIG. 1 is a block diagram illustrating an example electronic device in a network environment according to various embodiments.

Hereinafter, various example embodiments of the disclosure are described with reference to the accompanying drawings. Those of ordinary skill in the art will recognize that modifications, equivalents, and/or alternatives of the various embodiments described herein may be variously made without departing from the scope and spirit of the disclosure. With regard to description of drawings, similar reference numerals or designations may be used for similar components.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function or operation according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
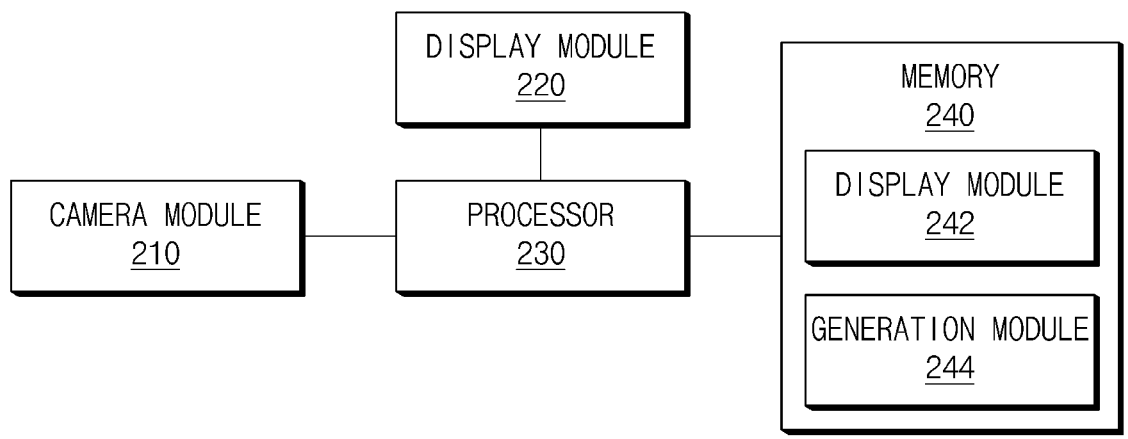
FIG. 2 is a schematic block diagram of an example electronic device according to various embodiments.
Figure 3:
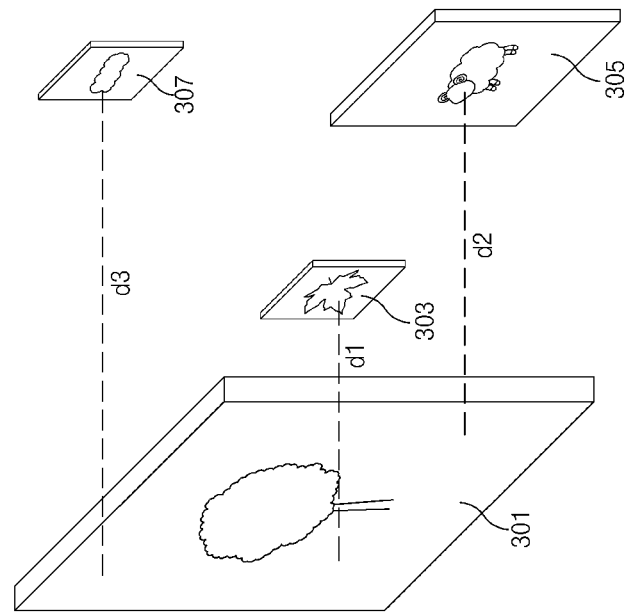
FIG. 3 is a diagram for describing a configuration of an example virtual object according to various embodiments.
Figure 3:
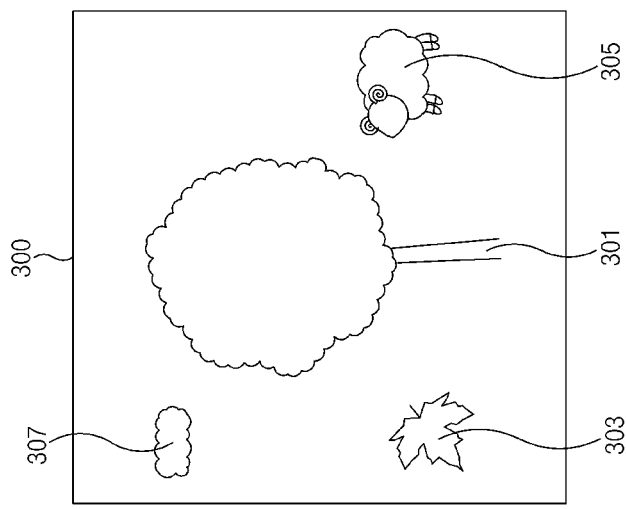

FIG. 2 is a schematic block diagram of an example electronic device according to various embodiments. Then, FIG. 3 is a diagram for describing a configuration of an example virtual object according to various embodiments.

Referring to FIG. 2, an electronic device 200 (e.g., an electronic device 101) may include a camera module 210 (e.g., a camera module 180), a display module 220 (e.g., a display module 160), a processor 230 (e.g., a processor 120), and a memory 240 (e.g., a memory 130). However, this is merely illustrative, and the above-mentioned components are not limited to the components of the electronic device 200 shown in FIG. 2. For example, the electronic device 200 may be implemented to have more components than the components shown in FIG. 2 or have fewer components than the components shown in FIG. 2. For example, the electronic device 200 may be configured to include a component such as an input module (e.g., a touch panel, a hard key, a proximity sensor, a biometric sensor, or the like) or a power supply unit.

According to various embodiments, the camera module 210 (including, e.g., a camera) may obtain a first image for an object of a real world (a real object) such as the appearance of a user (e.g., at least one of a face of the user, a body of the user, or an accessory worn by the user), a landscape, an animal, a plant, or a thing. The camera module 210 may obtain the first image based on a previously specified request (e.g., a request to run an augmented reality application). According to an embodiment, the electronic device 200 may include a plurality of camera modules 210 having different properties or functions. For example, at least one of the plurality of camera modules 210 may be a wide-angle camera, and at least another of the plurality of camera modules 210 may be a telephoto camera. Similarly, at least one of the plurality of camera modules 210 may be a front camera, and at least another of the plurality of camera modules 210 may be a rear camera. However, this is merely illustrative, and the disclosure is not limited in this respect. For example, the plurality of camera modules 210 may be provided together on the same surface of the electronic device 200.

According to various embodiments, the display module 220 (including, e.g., a display) may display various pieces of content (e.g., an application execution screen or the like) based on control of the processor 230. At least some of the displayed pieces of content may include the first image obtained using the camera module 210 and a virtual object capable of being applied to (or synthesized with) the first image. According to an embodiment, the electronic device 200 may include the at least one display module 220. For example, the at least one display module 220 may include a flat display, a curved display (or a bended display) capable of being curved, bent, or rolled without damage through a paper-thin, flexible substrate, or a flexible display capable of being bent and unfolded freely.

According to an embodiment, the virtual object may include a plurality of sub-objects displayed on the display module 220. Each sub-object may include at least one of text, an icon, or an image. However, this is illustrative, and the disclosure is not limited in this respect. For example, a partial configuration of the sub-object (e.g., respective strokes included in text) may be interpreted as one sub-object.

For example, as shown in FIG. 3, a first sub-object 301, a second sub-object 303, a third sub-object 305, and a fourth sub-object 307 may be a configuration of a virtual object 300. Each of such sub-objects 301, 303, 305, and 307 may be configured in the form of an independent layer, and the respective layers may be overlaid to generate the virtual object 300. Thus, the respective sub-objects 301, 303, 305, and 307 may independently change in location, size, and application time point to be applied to the first image. Additionally or alternatively, the virtual object 300 may include a sub-object having a depth with respect to any one sub-object. For example, as shown in FIG. 3, the first sub-object 301, the second sub-object 303 having a first depth (e.g., d1) with respect to the first sub-object 301, the third sub-object 305 having a second depth (e.g., d2) with respect to the first sub-object 301, and the fourth sub-object 307 having a third depth (e.g., d3) with respect to the first sub-object 301 may be provided as the configuration of the virtual object 300. Thus, the respective sub-objects 301, 303, 305, and 307 may be applied to the first image to have different depths, for example, a sense of perspective based on depth information.

According various embodiment, the processor 230 (including, e.g., processing circuitry) may control various components of the electronic device 200. According to an embodiment, the processor 230 may be operatively connected with the camera module 210, the display module 220, and the memory 240. The processor 230 may apply each of the plurality of sub-objects included in the virtual object to the first image. For example, the processor 230 may detect an input for selecting at least one of the plurality of sub-objects included in the virtual object and may generate a second image in which the selected sub-object is applied to a partial area in the first image corresponding to the input. In this regard, alternatively or additionally, the processor 230 may, for example, display a list of virtual objects on the display module 220 while the first image is displayed and may receive an input for selecting a virtual object. Furthermore, when receiving the input for selecting a virtual object, the processor 230 may display a list of a plurality of sub-objects included in the selected virtual object on the display module 220. The list of the plurality of sub-objects may be overlapped and displayed with at least a portion of the first image, but the disclosure is not limited in this respect. For example, the list of the plurality of sub-objects may be displayed independently of the first image. According to an embodiment, the processor 230 may store the second image generated by the first image and the sub-object internally (e.g., the memory 240) to the electronic device 200 or in an external electronic device (e.g., an electronic device 102, an electronic device 104, or a server 108).

According to various embodiments, the memory 240 may store a command or data associated with at least one other component of the electronic device 200. For example, the memory 240 may store at least one virtual object capable of being applied to (synthesized with) the first image displayed on the display module 220. Furthermore, the memory 240 may store the second image generated based on the first image and the virtual object.

According to various embodiments, the memory 240 may include at least one program module. The program module may, for example, include a program 140 of FIG. 1. The at least one program module may include a display module 242 and a generation module 244. However, this is merely illustrative, and the disclosure is not limited in this respect. For example, at least one of the above-mentioned modules may be excluded from the configuration of the memory 240. On the other hand, a module other than the above-mentioned modules may be added to the configuration of the memory 240. Furthermore, some of the above-mentioned modules may be integrated into another module.

According to an embodiment, the display module 242 may include, for example, an instruction to display the first image, the virtual object, and sub-objects included in the virtual object. According to an embodiment, the generation module 244 may include, for example, an instruction to generate the second image based on the first image and the virtual object.

FIGS. 4A-1, 4A-2, and 4A-3 are diagram for describing a situation in which an example electronic device applies a virtual object to a real object according to various embodiments. FIGS. 4B-1 and 4B-2 are diagrams for describing a result in which an example electronic device applies a virtual object to a real object according to various embodiments.

Referring to FIGS. 4A-1, 4A-2, and 4A-3, an electronic device 200 (or a processor 230 or an electronic device 101) may execute an augmented reality function. The electronic device 200 may drive a camera module 210 for obtaining a first image for a real object, in response to the execution of the augmented reality function. According to an embodiment, the electronic device 200 may process the execution of the augmented reality function, based on a request of a user to run an augmented reality application.

Figures 1, 4A:
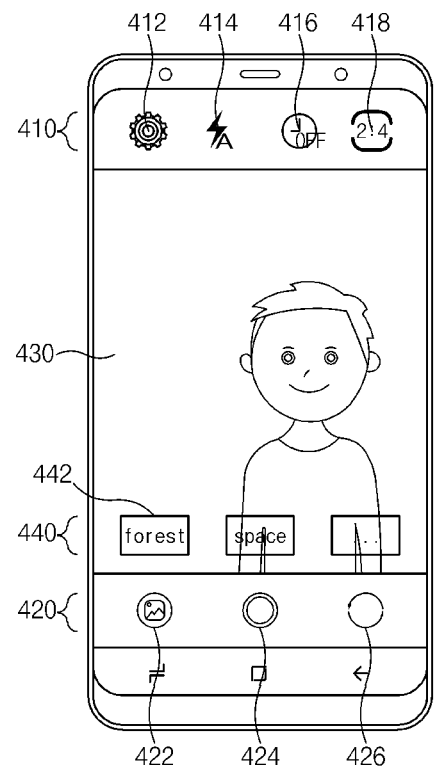
Figures 2, 4A:
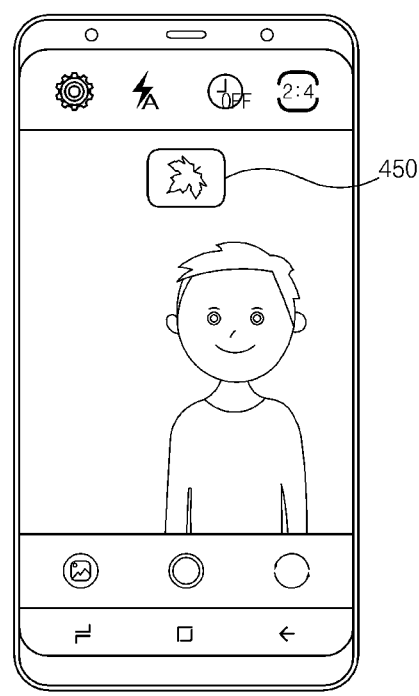
Figures 3, 4A:
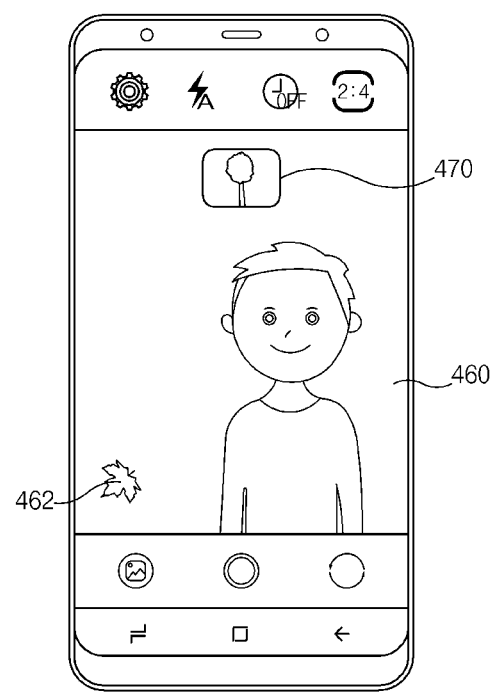
Figures 1, 4B:
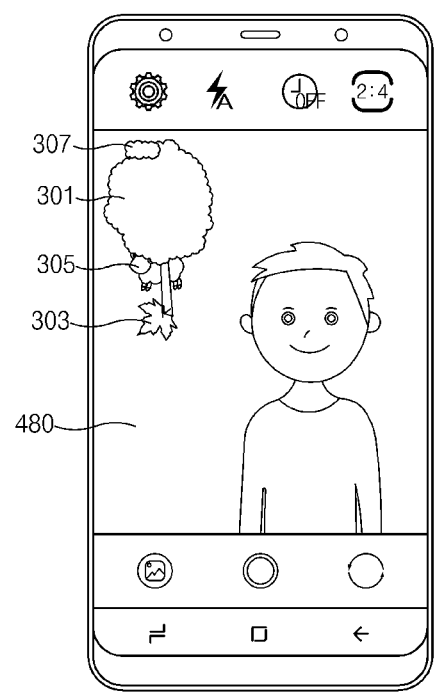
Figures 2, 4B:
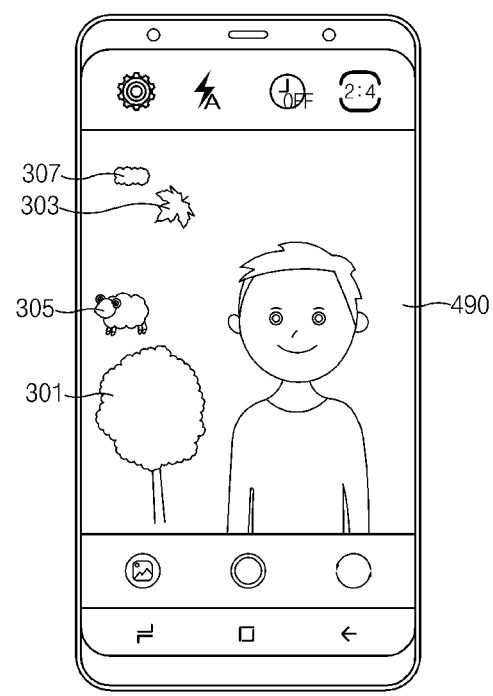

According to various embodiments, as shown in FIG. 4A-1, when the augmented reality function is executed, the electronic device 200 may output a user interface include a menu region 410 for providing an object(s) associated with setting the camera module 210, a control region 420 for providing an object(s) associated with controlling a specific function, and an augmented reality screen 430.

According to an embodiment, the menu region 410 may be disposed on an upper end of the user interface. The menu region 410 may include an object 412 for setting the augmented reality function, an object 414 for setting an operation of a flash, an object 416 for setting image capture with a timer, an object 418 for setting a ratio of a captured screen, and the like. According to an embodiment, the control region 420 may be disposed on a lower end of the user interface. The control region 420 may include an object 422 for controlling to enter a mode for identifying a stored image, an object 424 for controlling to obtain a preview image, an object 426 for controlling an operation of the camera module 210 for obtaining an image (e.g., an operation of a front camera module or an operation of a rear camera module), and the like. According to an embodiment, the augmented reality screen 430 may be disposed between the upper end (e.g., the menu region 410) and the lower end (e.g., the control region 420) of the user interface. The augmented reality screen 430 may be a real-time preview image obtained using the camera module 210. However, this is merely illustrative, and the disclosure is not limited in this respect. For example, the menu region 410 and the control region 420, which are described above, may be arranged at the left and right of the user interface or may have certain transparency to be overlaid with at least a portion of the augmented reality screen 430. Furthermore, objects other than the above-mentioned objects may be included in the menu region 410 and the control region 420.

According to an embodiment, the electronic device 200 may display a list 440 of virtual objects (e.g., a forest theme, a space theme, and the like). As shown, the list 440 of the virtual objects may be displayed together with the first image obtained using the camera module 210. According to an embodiment, the electronic device 200 may display the list 440 of the virtual objects in response to receiving a previously specified user input. However, this is merely illustrative, and the disclosure is not limited in this respect. For example, the list 440 of the virtual objects may be automatically displayed in response to displaying the first image. Furthermore, the list 440 of the virtual objects may be displayed, before the first image is displayed or after the displaying of the first image is ended.

According to various embodiments, when an input for selecting one virtual object (e.g., a forest theme) 442 from the list 440 is detected, as shown in FIG. 4A-2, the electronic device 200 may display a sub-object 450 corresponding to the selected virtual object. For example, the electronic device 200 may display guide information about a sub-object applicable to the first image. As described above, the virtual object may be include a plurality of sub-objects (e.g., first to fourth sub-objects 301, 303, 305, and 307). The electronic device 200 may display only some sub-objects (e.g., the second sub-object 303) corresponding to a specified number among the plurality of sub-objects as guide information on a screen. As another example, the electronic device 200 may display all the plurality of sub-objects as guide information on the screen. Thus, a user may easily select a sub-object applicable to the first image, using the guide information about the sub-object displayed on the screen. According to an embodiment, the electronic device 200 may output the guide information about the sub-object in response to receiving a previously specified user input or may automatically display the guide information about the sub-object in response to selecting the virtual object.

According to various embodiments, when an input for selecting the sub-object is detected, as shown in FIG. 4A-3, the electronic device 200 may generate a second image based on the selected sub-object and the first image. The electronic device 200 may monitor a change in location of the input for selecting the sub-object to determine a location in the first image to which the sub-object will be applied and may generate a second image 460 in which the sub-object is applied to the determined location (462). For example, the electronic device 200 may determine a location of the selected sub-object on the first image based on depth information of the selected sub-object. At this time, the electronic device 200 may switch the sub-object displayed as the guide information to another sub-object (470). For example, the electronic device 200 may display another sub-object (e.g., the first sub-object 301), which is not applied to the first image, as guide information. However, this is merely illustrative, and the disclosure is not limited in this respect. For example, the sub-object which was applied to the first image may also be displayed as guide information. According to various embodiments, the sub-object displayed as the guide information may switch to another sub-object irrespective of the selection of the sub-object (470). For example, the electronic device 200 may switch the sub-object displayed as the guide information to another sub-object, in response to receiving a previously specified user input (470). Thus, the user may select a desired sub-object among the plurality of sub-objects included in the virtual object using an input. At this time, a display location of the sub-object selected by the user may become different from a display location of another sub-object based on depth information.

According to various embodiments, the electronic device 200 may apply the respective sub-objects included in the virtual object to the first image to make it possible to create content expressing user's own personality. For example, although the user uses the same virtual object, a second image 480 in which locations of the respective sub-objects (e.g., the sub-objects 301, 303, 305, and 307) are arranged on a first portion (e.g., a left upper end) of the first image may be generated as shown in FIG. 4B-1 and a second image 490 in which some (e.g., the sub-objects 303 and 307) of the sub-objects are arranged on the first portion (e.g., the left upper end) of the first image and the others (e.g., the sub-objects 301 and 305) of the sub-objects are arranged on a second portion (e.g., a left lower end) of the first image may be generated as shown in FIG. 4B-2.

According to various embodiments, as described above with reference to FIGS. 4A-1, 4A-2, and 4A-3, the electronic device 200 may provide a list of virtual objects and a list of sub-objects for the virtual objects together with the first image. However, this is merely illustrative, and the disclosure is not limited in this respect. For example, the electronic device 200 may omit providing the list of the virtual objects and may display at least one previously specified sub-object (e.g., a default sub-object) while the first image is displayed.

An electronic device (e.g., an electronic device 200) according to various example embodiments may include at least one camera module (e.g., a camera module 210), at least one display module (e.g., a display module 220), a memory (e.g., a memory 240) storing a virtual object including a plurality of sub-objects, each of which has a depth, and a processor (e.g., a processor 230) operatively connected with the at least one camera module, the at least one display module, and the memory. According to an embodiment, the processor may be configured to output a first image for a real object obtained using the at least one camera module, output a list of virtual objects applicable to the first image, output sub-objects corresponding to a virtual object selected from the list, and generate a second image in which at least one sub-object selected among the sub-objects is applied to the first image.

According to various example embodiments, the processor may be configured to output first sub-objects including some of the sub-objects and, when at least one the first sub-objects is applied to the first image, output second sub-objects including others of the sub-objects.

According to various example embodiments, the processor may be configured to output a first type of sub-object, when a specified first object is recognized from the first image, and output a second type of sub-object, when a specified second object is recognized from the first image.

According to various example embodiments, the first type of sub-object may include one sub-object, and the second type of sub-object may include a plurality of sub-objects.

According to various example embodiments, the processor may be configured to overlap and display the first type of sub-object with at least a portion or the specified first object.

According to various example embodiments, the specified first object may include at least one of a part of a person's body or a part of an animal's body, and the specified second object may include at least one of a landscape, a plant, or a thing.

According to various example embodiments, the processor may be configured to identify a depth of the selected at least one sub-object and apply the selected at least one sub-object to the first image based on the depth.

According to various example embodiments, the processor may be configured to obtain first state information associated with motion of a specified first object of the first image, when the selected at least one sub-object is applied to the specified first object, and apply an effect to the at least one sub-object applied to the specified first object, based on the first state information.

According to various example embodiments, the specified first object may include at least one of a part of a person's body or a part of an animal's body.

According to various example embodiments, the processor may be configured to obtain a posture of the electronic device and second state information, when the selected at least one sub-object is applied to a specified second object of the first image, and apply an effect to the specified second object and the at least one sub-object applied to the second object, based on the second state information.

According to various example embodiments, the specified second object may include at least one of a landscape, a plant, or a thing.

According to various example embodiments, the processor may be configured to differently set locations, sizes, or application time points for respective sub-objects configured in the selected virtual object.

According to various example embodiments, the processor may be configured to store the generated second image in the electronic device or in an external electronic device.

An electronic device (e.g., an electronic device 200) according to various example embodiments may include at least one camera module (e.g., a camera module 210), at least one display module (e.g., a display module 220), a memory (e.g., a memory 240) storing a virtual object including a plurality of sub-objects, each of which has a depth, and a processor (e.g., a processor 230) operatively connected with the at least one camera module, the at least one display module, and the memory. According to an embodiment, the processor may be configured to obtain a first image for a real object obtained using the at least one camera module, determine a location of at least one sub-object applicable to the first image on the first image based on a depth of the at least one sub-object, synthesize the at least one sub-object, the location of which is determined, with the first image to generate a second image, and output the second image.

Figure 5:
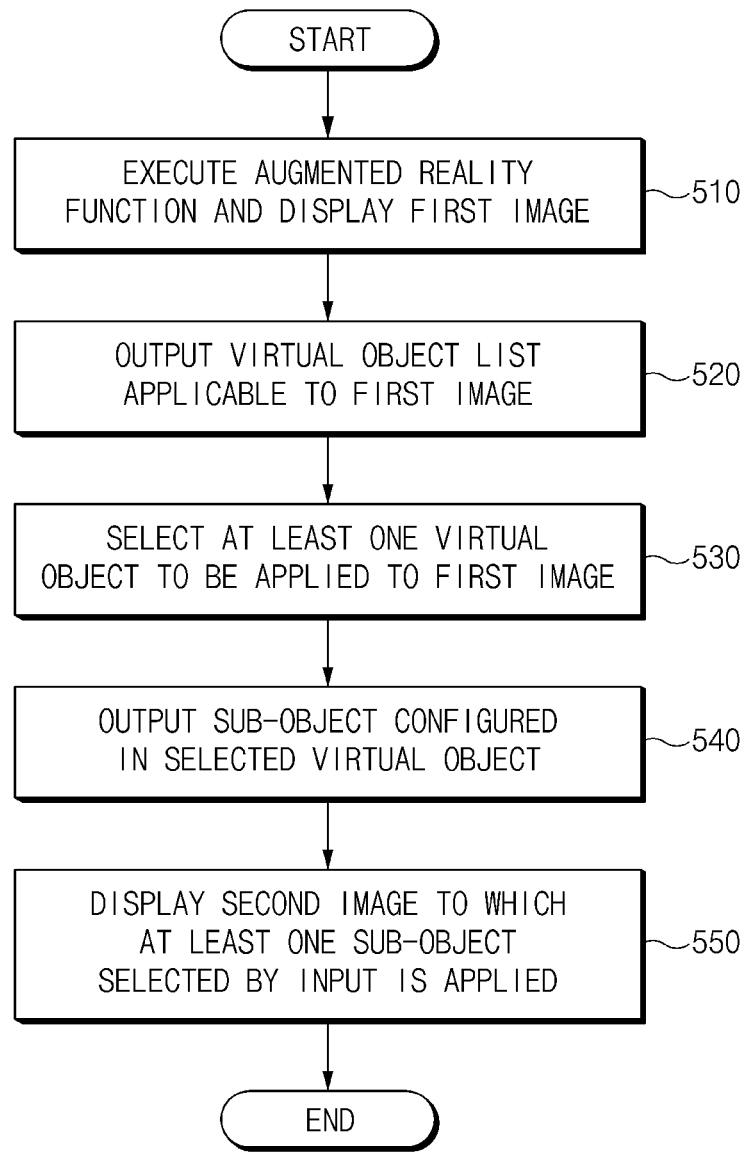
FIG. 5 is a flowchart illustrating an example operation in which an example electronic device applies a virtual object to a real object according to various embodiments.

FIG. 5 is a flowchart illustrating an example operation in which an example electronic device applies a virtual object to a real object according to various embodiments.

Referring to FIG. 5, in operation 510, an electronic device 200 (or a processor 230) according to various embodiments may execute an augmented reality function and may display a first image for a real object. The first image may be obtained using a camera module 210 driven in response to executing the augmented reality function. According to an embodiment, the electronic device 200 may process the execution of the augmented reality function, based on a request of a user to run an augmented reality application.

According to various embodiments, in operation 520, the electronic device 200 may output a virtual object list. According to an embodiment, the electronic device 200 may output a list of virtual objects applicable to a first image.

According to various embodiments, in operation 530, the electronic device 200 may select at least one virtual object to be applied to the first image, based on an input to the list. An input for selecting the virtual object may include a touch, a gesture, proximity, or a hovering input using an electronic pen or a part of the user's body, and the disclosure is not limited in this respect. For example, the virtual object may be selected using an input of a hard key.

According to various embodiments, in operation 540, the electronic device 200 may output sub-objects corresponding to the selected virtual object. According to an embodiment, the virtual object may include a plurality of sub-objects, and each sub-object may be configured in the form of an independent layer. The electronic device 200 may display only some of the plurality of sub-objects on a screen or may display all the plurality of sub-objects at once.

According to various embodiments, in operation 550, the electronic device 200 may display a second image, based on the first image and the at least one sub-object corresponding to the virtual object selected by the input. According to an embodiment, the electronic device 200 may monitor a change in location of an input for selecting a sub-object to determine a location in the first image to which the sub-object will be applied and may generate the second image in which the sub-object is applied to the determined location.

Figure 6A:
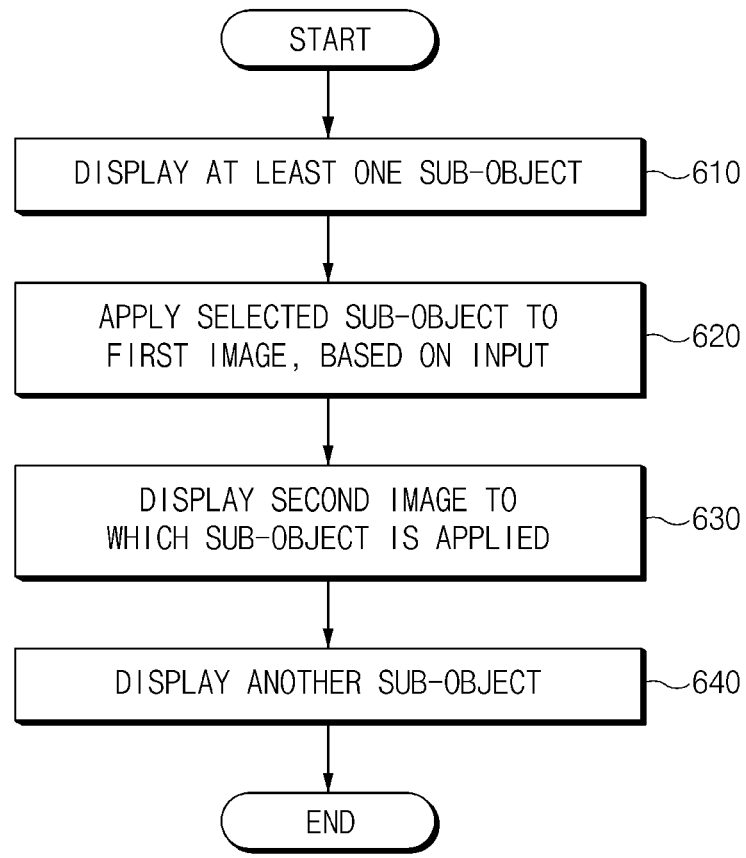
FIG. 6A is a flowchart illustrating an example operation in which an example electronic device displays a sub-object according to various embodiments.
Figure 6B:
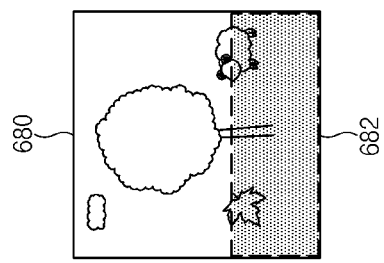
FIG. 6B is a diagram for describing a situation in which an example sub-object is displayed according to various embodiments.
Figure 6B:
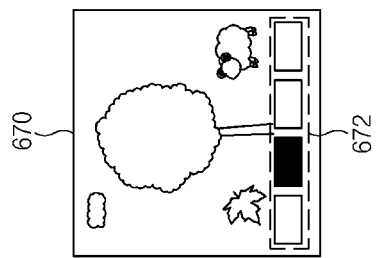
Figure 6B:
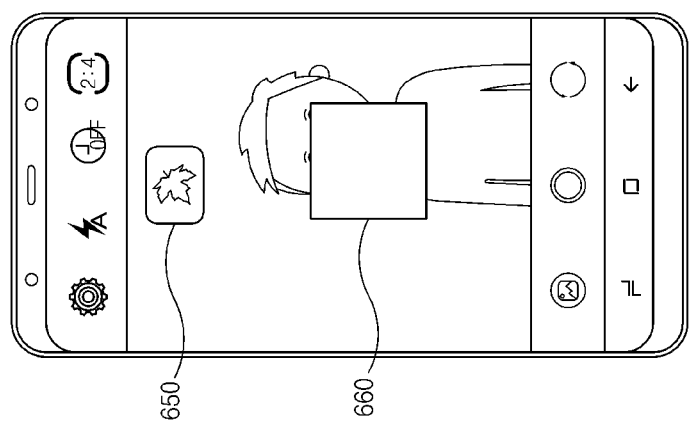

FIG. 6A is a flowchart illustrating an example operation in which an example electronic device displays a sub-object according to various embodiments. FIG. 6B is a diagram for describing a situation in which a sub-object is displayed according to various embodiments. Operations of FIG. 6A, which will be described below, may indicate various embodiments for operation 540 of FIG. 5.

Referring to 6A, in operation 610, an electronic device 200 (or a processor 230) according to various embodiments may display at least one sub-object 650. As described above, a virtual object may include a plurality of sub-objects. The electronic device 200 may display some of the plurality of sub-objects on a display module 220. According to an embodiment, additionally or alternatively, as shown in FIG. 6B, the electronic device 200 may provide information 660 indicating progress in displaying a sub-object. The information (660) may refer to a display order (e.g., a depth order) of a currently displayed sub-object among sub-objects included in the virtual object. For example, as shown in FIG. 6B, the electronic device 200 may provide information (e.g., a shaded box) 672 indicating that a second sub-object among four sub-objects included in the virtual object is currently displayed. Such information (672) may be displayed together with a thumbnail image 670 in which horizontal and vertical sizes of the virtual object are reduced or resolution of the virtual object is reduced. As another example, the electronic device 200 may provide information indicating a degree of progress in displaying a sub-object. For example, as shown in FIG. 6B, the electronic device 200 may shade a 30% of a thumbnail image 680 of the virtual object, when a sub-object corresponding to 30% of sub-objects included in the virtual object proceeds with being currently displayed (682). Furthermore, when all sub-objects proceed with being currently displayed for the virtual object, the electronic device 200 may shade the entire thumbnail image of the virtual object. Thus, a user may easily select a sub-object applicable to the first image.

According to various embodiments, in operation 620, the electronic device 200 may apply the sub-object to the first image based on an input. According to an embodiment, the electronic device 200 may select a sub-object to be applied to the first image based on a location where an input (e.g., a touch input) is detected. Furthermore, the electronic device 200 may detect a change in location of an input (e.g., a drag input) to determine a location in the first image to which the sub-object will be applied.

According to various embodiments, in operation 630, the electronic device 200 may display a second image to which the sub-object is applied.

According to various embodiments, in operation 640, the electronic device 200 may display another sub-object. As described above with reference to FIGS. 4A-1, 4A-2, and 4A-3, the displayed other sub-object may be at least one of sub-objects additionally applicable to the second image. The other sub-object may be displayed together with the second image.

Figure 7:
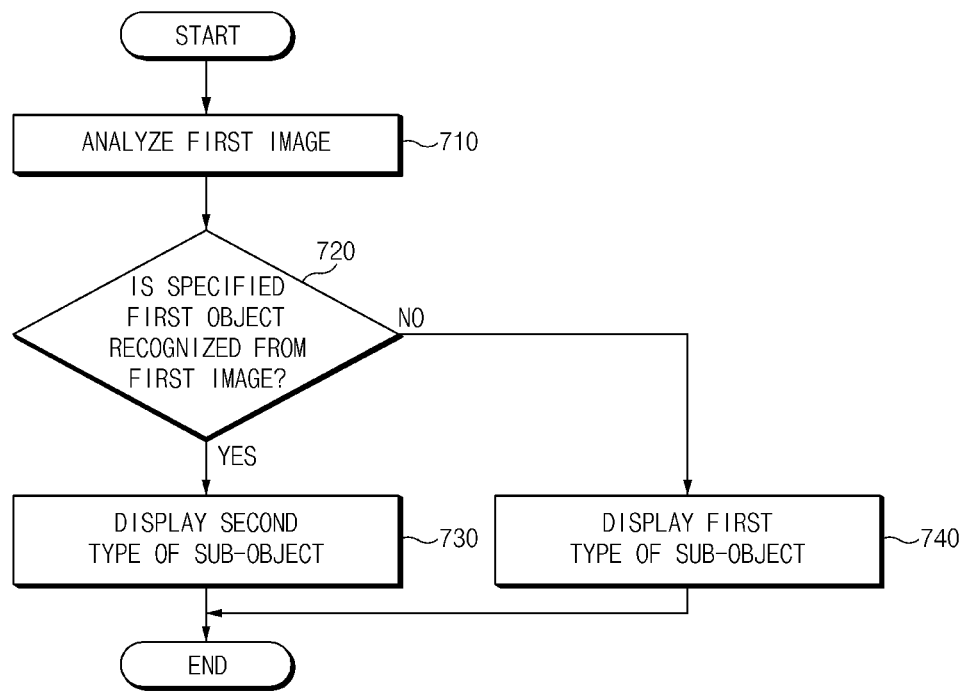
FIG. 7 is a flowchart illustrating an example operation in which an example electronic device displays a sub-object according to various embodiments.
Figure 8:
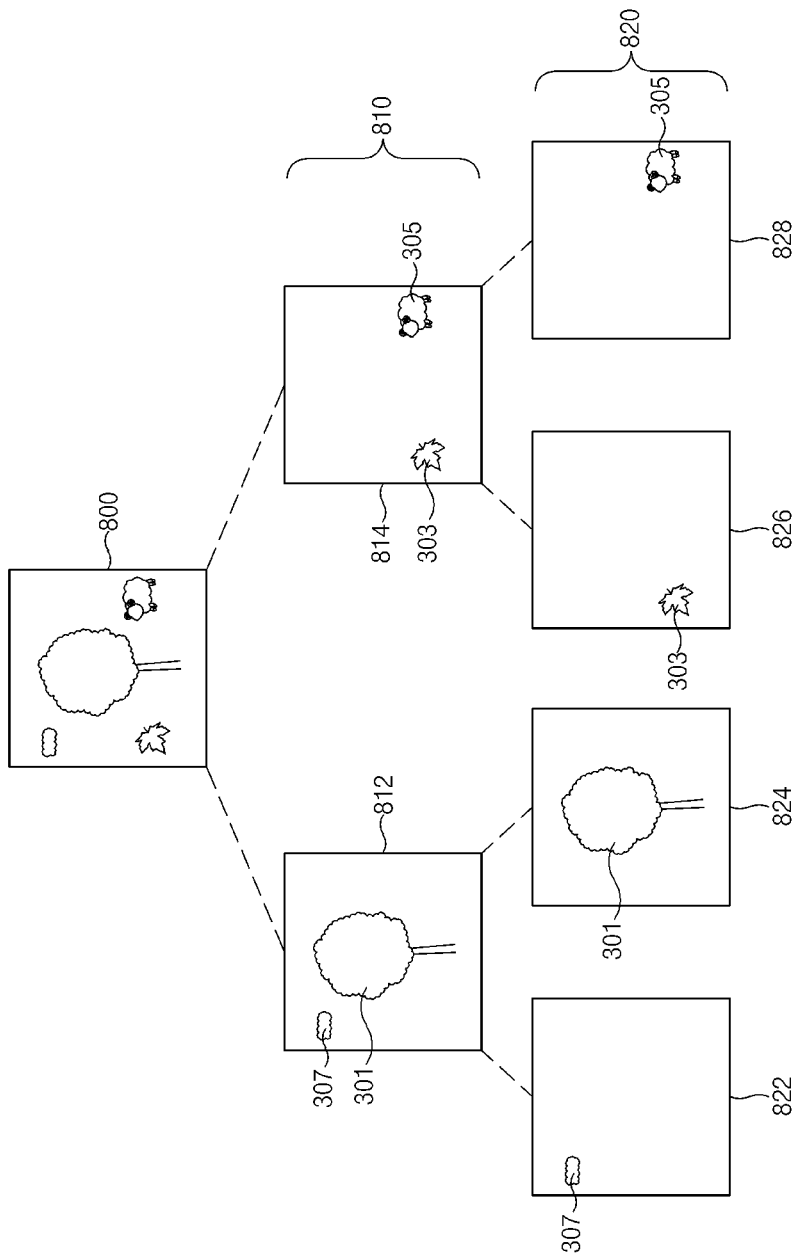
FIG. 8 is a diagram for describing a configuration of an example virtual object according to various embodiments.

FIG. 7 is a flowchart illustrating an example operation in which an example electronic device displays a sub-object according to various embodiments. FIG. 8 is a diagram for describing a configuration of an example virtual object according to various embodiments. FIG. 9 is a diagram for describing a situation in which an example sub-object is displayed according to various embodiments. Operations of FIG. 7, which will be described below, may indicate various embodiments for operation 540 of FIG. 5.

Referring to FIG. 7, in operation 710, an electronic device 200 (or a processor 230) according to various embodiments may analyze a first image. According to an embodiment, the electronic device 200 may perform an image analysis operation for the first image obtained using a camera module 210 to recognize an object in a real world.

According to various embodiments, in operation 720, the electronic device 200 may determine whether a specified first object is recognized or a specified second object is recognized as a result of analyzing the first image. The specified first object may include a part (e.g., a face, a hand, or the like) of a person's body and a part (e.g., a face, a leg, a tail, or the like) of an animal's body. The specified second object may include the remaining objects, such as a landscape, a plant, and a thing, other than the specified first object.

Figure 9A:
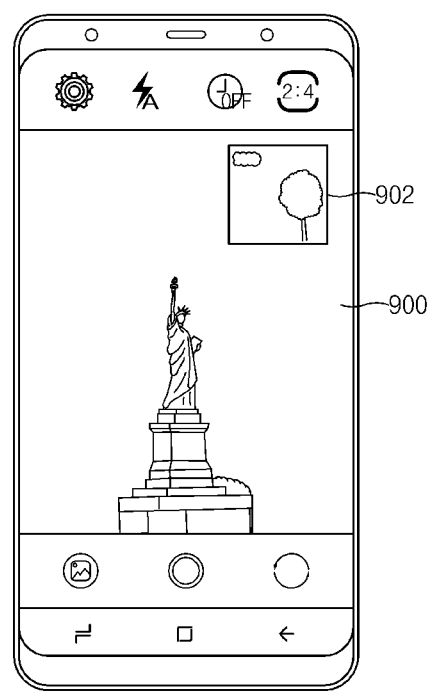
FIGS. 9A and 9B are diagrams for describing a situation in which an example sub-object is displayed according to various embodiments.
Figure 9B:
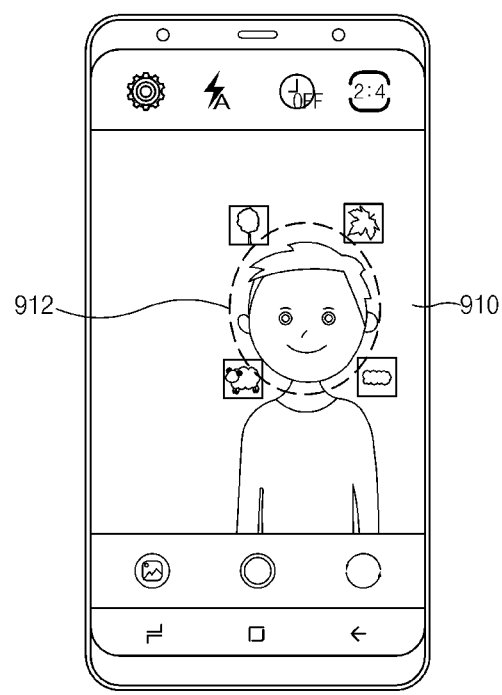

According to various embodiments, when the specified first object is recognized from the first image, in operation 730, the electronic device 200 may display a second type of sub-object. As shown in FIG. 8, a virtual object 800 may include first types of sub-objects 810, each of which includes a plurality of layers (or sub-objects). Each of the first types of sub-objects 810 may include second types of sub-objects 820, each of which includes a single layer. For example, the first types of sub-objects 810 may include a first type of sub-object 812 including a first layer 301 and a fourth layer 307 and a first type of sub-object 814 including a second layer 303 and a third layer 305. Furthermore, the second types of sub-objects 820 may include a second type of sub-object 824 including the first layer 301, a second type of sub-object 822 including the fourth layer 307, a second type of sub-object 826 including the second layer 303, and a second type of sub-object 828 including the third layer 305. According to an embodiment, the electronic device 200 may display a second type of sub-object including a single layer together with the first image, based on recognizing the specified first object. For example, as shown in FIG. 9B, the second type of sub-object including the single layer may be overlapped and displayed with at least a portion of a specified first object 910 (912). However, this is merely illustrative, and the disclosure is not limited in this respect. For example, the second type of sub-object may be displayed adjacent to the specified first object.

According to various embodiments, when the specified second object is recognized from the first image, in operation 740, the electronic device 200 may display a first type of sub-object. The electronic device 200 may display a first type of sub-object including a plurality of layers together with the first image, based on recognizing the specified second object. For example, as shown in FIG. 9A, the second type of sub-object including the plurality of layers may be displayed on an empty space where the specified second object is not displayed in the first image 900 (902). However, this is merely illustrative, and the disclosure is not limited in this respect. For example, the first type of sub-object may be overlapped and displayed with at least a portion of to the specified second object.

Figure 10:
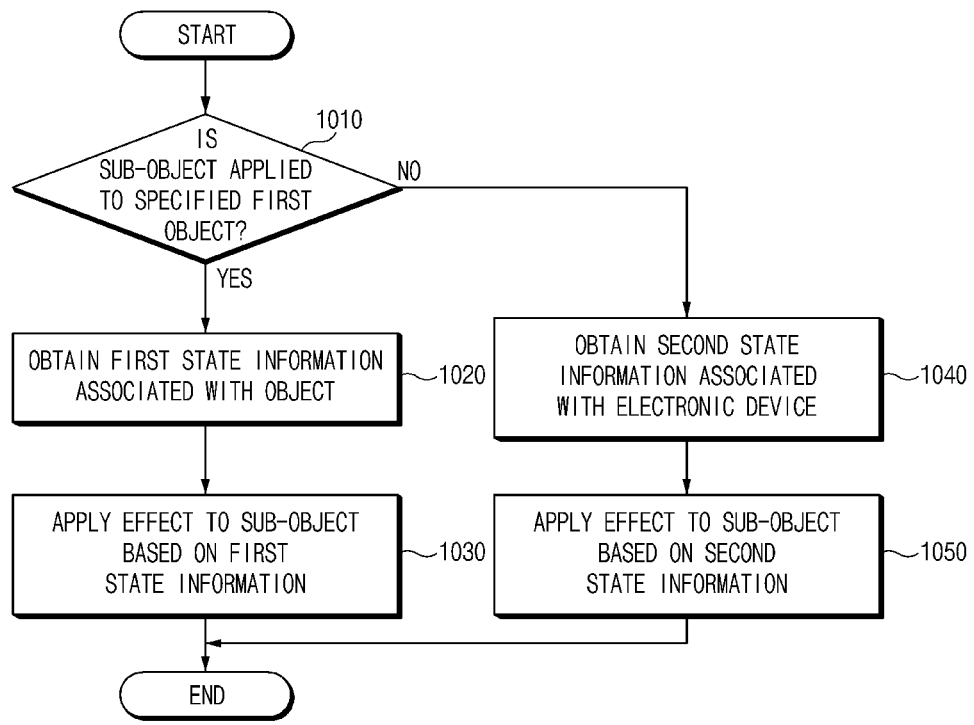
FIG. 10 is a flowchart illustrating an example operation in which an example electronic device displays a real object to which a sub-object is applied according to various embodiments.
Figures 1, 11A:
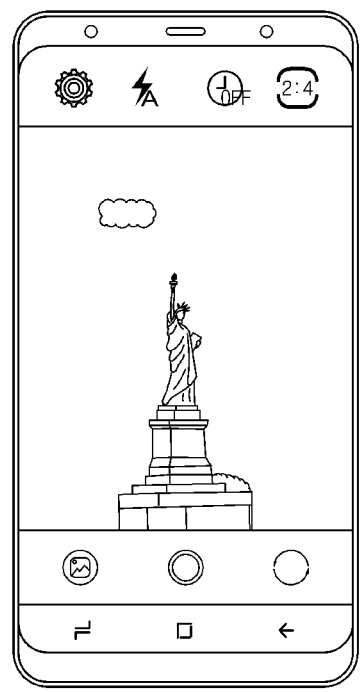
Figures 2, 11A:
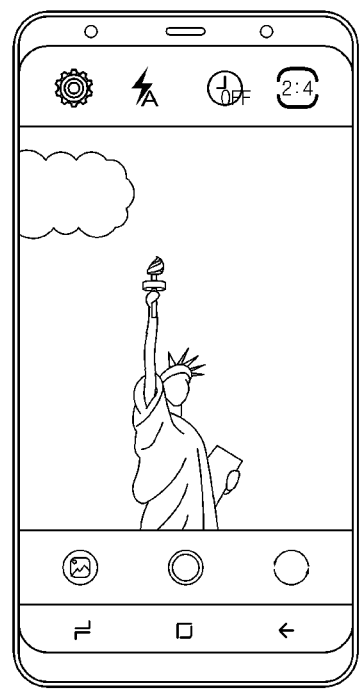
Figures 1, 11B:
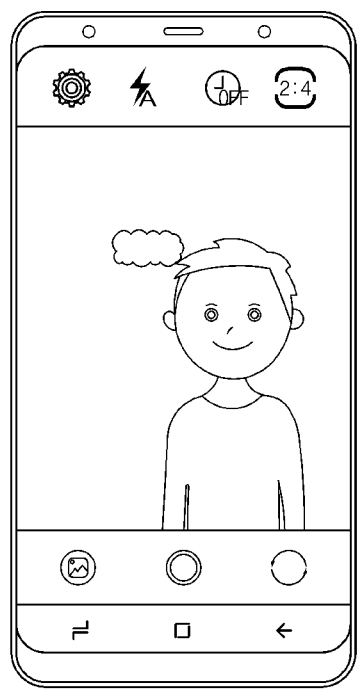
Figures 2, 11B:
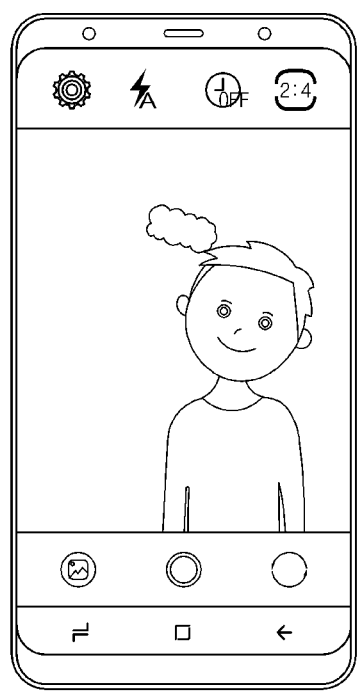

FIG. 10 is a flowchart illustrating an example operation in which an example electronic device displays a real object to which a sub-object is applied according to various embodiments. FIGS. 11A-1 and 11A-2 are diagrams for describing a situation in which an example effect is applied to a sub-object based on state information associated with an example electronic device. FIGS. 11B-1 and 11B-2 are diagrams for describing a situation in which an example effect is applied to a sub-object based on state information associated with an object. Operations of FIG. 10, which will be described below, may indicate various embodiments for operation 550 of FIG. 5.

Referring to FIG. 10, in operation 1010, an electronic device 200 (or a processor 230) according to various embodiments may determine whether a sub-object is applied to a specified first object or a specified second object. As described above, the specified first object may include a face of a person, and the specified second object may include the rest except for the specified first object, for example, a landscape, an animal, a plant, or a thing. In this regard, the electronic device 200 may recognize an object from a first image using an object recognition algorithm.

According to various embodiments, when the sub-object is applied to the specified first object, in operation 1020, the electronic device 200 may obtain first state information associated with the object. The first state information may be associated with motion for the object in the first image. In this regard, the electronic device 200 may detect motion of the object recognized from the first image using an object tracking algorithm. Furthermore, in operation 1030, the electronic device 200 may apply an effect to the sub-object based on the first state information. For example, the sub-object may be applied to the specified first object as shown in FIG. 11B-1, and the sub-object applied to the specified first object may be moved and displayed in response to the motion of the specified first object as shown in FIG. 11B-2.

According to various embodiments, when the sub-object is applied to the specified second object, in operation 1040, the electronic device 200 may obtain second state information associated with the electronic device 200. The second state information may, for example, be associated with a posture of the electronic device 200. In this regard, the electronic device 200 may monitor a posture of the electronic device 200 and may detect a state change (e.g., a posture of the electronic device 200) based on a change in posture information (e.g., a pitch, a roll, a yaw, or the like) of the electronic device 200. Furthermore, in operation 1050, the electronic device 200 may apply an effect to the sub-object based on the state of the electronic device 200. For example, the sub-object may be applied to the specified second object as shown in FIG. 11A-1, and the specified second object and the sub-object may be displayed by performing perspective transformation in response to the state of the electronic device 200 as shown in of FIG. 11A-2.

Figure 12:
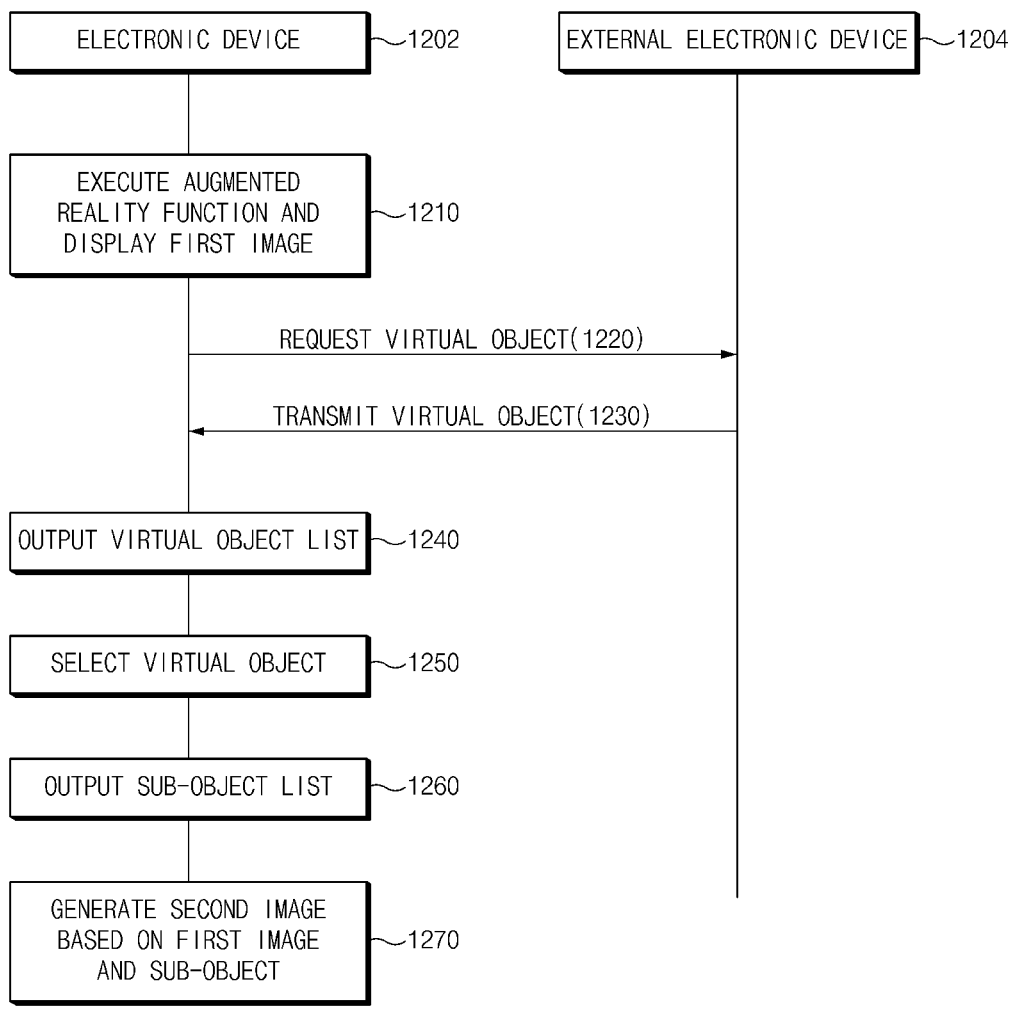
FIG. 12 is a flowchart illustrating an example operation in which an example electronic device applies a virtual object to a real object according to various embodiments.

FIG. 12 is a flowchart illustrating an example operation in which an example electronic device applies a virtual object to a real object according to various embodiments.

Referring to FIG. 12, an electronic device 1202 (e.g., an electronic device 200) may receive a virtual object from an external electronic device 1204 (e.g., an electronic device 102, an electronic device 104, or a server 108).

According to various embodiments, in operation 1210, the electronic device 1202 may execute an augmented reality function and may display a first image for a real object. As described above, the first image may be obtained using a camera module 210 driven in response to executing the augmented reality function.

According to various embodiments, when the augmented reality function is executed, in operation 1220, the electronic device 1202 may request a virtual object from the external electronic device 1204. In this regard, the electronic device 1202 may perform an operation of communicating with the external electronic device 1204 over a first network (e.g., a short range wireless communication network) or a second network (e.g., a long range wireless communication network).

According to various embodiments, in response to the virtual object request, in operation 1230, the external electronic device 1204 may transmit at least one virtual object to the electronic device 1202.

According to various embodiments, in operation 1240, the electronic device 1202 may output a virtual object list. According to an embodiment, the electronic device 1202 may output a list of virtual objects provided from the external electronic device 1204. At this time, when there is a virtual object previously stored in the electronic device 1202, the electronic device 1202 may output a list of the stored virtual objects together with the virtual objects provided from the external electronic device 1204.

According to various embodiments, in operation 1250, the electronic device 1202 may select at least one virtual object to be applied to the first image, based on an input to the list.

According to various embodiments, in operation 1260, the electronic device 1202 may output sub-objects corresponding to the selected virtual object. According to an embodiment, the virtual object may include a plurality of sub-objects, and each sub-object may be configured in the form of an independent layer. The electronic device 1202 may display only some of the plurality of sub-objects on a screen or may display all the plurality of sub-objects at once.

According to various embodiments, in operation 1270, the electronic device 1202 may display a second image, based on the first image and the at least one sub-object. According to an embodiment, the electronic device 1202 may monitor a change in location of an input for selecting the sub-object to determine a location in the first image to which the sub-object will be applied and may generate the second image in which the sub-object is applied to the determined location.

An operating method of an electronic device (e.g., an electronic device 200) according to various example embodiments may include outputting a first image for a real object, outputting a list for a virtual object including a plurality of sub-objects, each of which has a depth, receiving an input for selecting at least one virtual object applicable to the first image, outputting sub-objects included in the virtual object selected by the input, and generating a second image in which at least one sub-object among the sub-objects is applied to the first image.

According to various example embodiments, the operating method of the electronic device may include outputting first sub-objects including some of the sub-objects and outputting second sub-objects including others of the sub-objects, when at least one of the first sub-objects is applied to the first image.

According to various example embodiments, the operating method of the electronic device may include outputting a first type of sub-object, when a specified first object is recognized from the first image, and outputting a second type of sub-object, when a specified second object is recognized from the first image.

According to an example embodiment, the first type of sub-object may include one sub-object, and the second type of sub-object may include a plurality of sub-objects.

According to various example embodiments, the operating method of the electronic device may include overlapping and displaying the first type of sub-object with at least a portion of the specified first object.

According to various example embodiments, the specified first object may include at least one of a part of a person's body or a part of an animal's body, and the specified second object may include at least one of a landscape, a plant, or a thing.

According to various example embodiments, the operating method of the electronic device may include identifying a depth of a selected at least one sub-object and applying the selected at least one sub-object to the first image based on the depth.

According to various example embodiments, the operating method of the electronic device may include obtaining first state information associated with motion of a specified first object of the first image, when the selected at least one sub-object is applied to the specified first object, and applying an effect to the at least one sub-object applied to the specified first object, based on the first state information.

According to an example embodiment, the specified first object may include at least one of a part of a person's body or a part of an animal's body.

According to various example embodiments, the operating method of the electronic device may include obtaining a posture of the electronic device and second state information, when the selected at least one sub-object is applied to a specified second object of the first image, and applying an effect to the specified second object and the at least one sub-object applied to the second object, based on the second state information.

According to an example embodiment, the specified second object may include at least one of a landscape, a plant, or a thing.

According to various example embodiments, the operating method of the electronic device may include differently setting locations, sizes, or application time points for respective sub-objects configured in the selected virtual object.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   at least one camera module including a camera;
   at least one display module including a display;
   at least one processor comprising processing circuitry; and
   memory electrically connected to the at least one camera module, the at least one display module, and the at least one processor and storing instructions,
   wherein the instructions, when executed by the at least one processor, cause the electronic device to:
      output a first image for a real object obtained using the at least one camera module;
      output a list of at least one virtual object applicable to the first image;
      in response to receiving a first input for selecting the at least one virtual object, output a first sub-objects list comprising two or more sub-objects from among a plurality of sub-objects that the selected at least one virtual object comprises, wherein the first sub-object list includes a first sub-object having a first depth and a second sub-object having a second depth with respect to the first sub-object; and in response to receiving a second input for selecting one sub-object from among the first sub-object and the second sub-object, generate a second image in which the selected one sub-object is applied to the first image based on a depth of the selected one sub-object.

2. The electronic device of claim 1, wherein the instructions, when executed by the at least one processor, cause the electronic device to:

output the first sub-objects list including some of the plurality of sub-objects that the selected at least one virtual object comprises; and output a second sub-objects list including others of the plurality of sub-objects that the selected at least one virtual object comprises, when the selected one sub-objects is applied to the first image, wherein the second sub-object list includes a third sub-object having a third depth with respect to the first sub-object.

3. The electronic device of claim 1, wherein the instructions, when executed by the at least one processor, cause the electronic device to:

output a first type of first sub-object list, when a specified first object is recognized from the first image; and output a second type of first sub-object list, when a specified second object is recognized from the first image, wherein the first type of first sub-object list includes a first layer including the first sub-object and a second layer including the second sub-object, and wherein the second type of first sub-object list includes a third layer including the first sub-object and the second sub-object.

4. The electronic device of claim 3, wherein the instructions, when executed by the at least one processor, cause the electronic device to:

overlap and display the first type of first sub-object list with at least a portion of the specified first object.

5. The electronic device of claim 3, wherein the specified first object includes at least one of a part of a person's body or a part of an animal's body, and wherein the specified second object includes remaining objects except for the specified first object.

6. The electronic device of claim 1, wherein the instructions that, when executed by the at least one processor, cause the electronic device to:

determine a location in the first image to which the selected one sub-object is applied based on a change in location of the second input; and apply the selected one sub-object to the determined location of the first image.

7. The electronic device of claim 1, wherein the instructions, when executed by the at least one processor, cause the electronic device to:

obtain first state information associated with motion of a specified first object of the first image, when the selected one sub-object is applied to the specified first object; and apply an effect to the selected one sub-object applied to the specified first object, based on the first state information, and wherein the specified first object includes at least one of a part of a person's body or a part of an animal's body.

8. The electronic device of claim 1, wherein the instructions, when executed by the at least one processor, cause the electronic device to:

obtain second state information associated with a posture of the electronic device, when the selected one sub-object is applied to a specified second object of the first image; and apply an effect to the specified second object and the selected one sub-object applied to the second object, based on the second state information, and wherein the specified second object includes objects recognized from the first image except for a specified first object that is recognized from the first image, wherein the specified first object includes at least one of a part of a person's body or a part of an animal's body.

9. The electronic device of claim 1, wherein the instructions, when executed by the at least one processor, cause the electronic device to:

set different locations, sizes, or application time points for respective sub-objects configured in the selected at least one virtual object.

10. The electronic device of claim 1, wherein the instructions, when executed by the at least one processor, cause the electronic device to:

store the generated second image in the electronic device or an external electronic device.

11. An operating method of an electronic device, the operating method comprising:

outputting a first image for a real object;

outputting a list of at least one virtual object;

receiving a first input for selecting the at least one virtual object applicable to the first image;

in response to receiving the first input, outputting a first sub-objects list comprising two or more sub-objects from among a plurality of sub-objects that the selected at least one virtual object comprises, wherein the first sub-object list includes a first sub-object having a first depth and a second sub-object having a second depth with respect to the first sub-object; and in response to receiving a second input for selecting one sub-object from among the first sub-object and the second sub-object, generating a second image in which the selected one sub-object is applied to the first image based on a depth of the selected one sub-object.

12. The operating method of claim 11, further comprising:

outputting the first sub-objects list including some of the plurality of sub-objects that the selected at least one virtual object comprises; and outputting a second sub-objects list including others of the plurality of sub-objects that the selected at least one virtual object comprises, when the selected one sub-objects is applied to the first image, wherein the second sub-object list includes a third sub-object having a third depth with respect to the first sub-object.

13. The operating method of claim 11, further comprising:

outputting a first type of first sub-object list, when a specified first object is recognized from the first image; and outputting a second type of first sub-object list, when a specified second object is recognized from the first image, wherein the first type of first sub-object list includes one sub-object, wherein the second type of sub-object includes a third layer including the first sub-object and the second sub-object.

14. The operating method of claim 13, wherein the specified first object includes at least one of a part of a person's body or a part of an animal's body, and wherein the specified second object includes remaining objects except for the specified first object.

15. The operating method of claim 13, further comprising:
overlapping and displaying the first type of first sub-object list with at least a portion of the specified first object.

16. The operating method of claim 11, further comprising:
determining a location in the first image to which the selected one sub-object is applied based on a change in location of the second input; and
applying the selected one sub-object to the determined location of the first image.

17. The operating method of claim 11, further comprising:
obtaining first state information associated with motion of a specified first object of the first image, when the selected one sub-object is applied to the specified first object; and
applying an effect to the selected one sub-object applied to the specified first object, based on the first state information,
wherein the specified first object includes at least one of a part of a person's body or a part of an animal's body.

18. The operating method of claim 11, further comprising:
obtaining a posture of the electronic device and second state information, when the selected one sub-object is applied to a specified second object of the first image; and
applying an effect to the specified second object and the selected one sub-object applied to the second object, based on the second state information,
wherein the specified second object includes at least one of a landscape, a plant, or a thing.

19. The operating method of claim 11, further comprising:
setting different locations, sizes, or application time points for respective sub-objects configured in the selected at least one virtual object.

20. An electronic device, comprising:
at least one camera module including a camera;
at least one display module including a display;
memory storing a virtual object including a plurality of sub-objects, each of which has a depth, and
a processor, comprising processing circuitry, operatively connected with the at least one camera module, the at least one display module, and the memory,
wherein the processor is configured to:
obtain a first image for a real object obtained using the at least one camera module;
determine a location of two or more sub-objects applicable to the first image on the first image based on a depth of each of the two or more sub-objects;
synthesize the two or more sub-objects, the location of which is determined, with the first image to generate a second image; and
output the second image,
wherein the two or more sub-objects includes a first sub-object having a first depth and a second sub-object having a second depth with respect to the first sub-object.

* * * * *